United States Patent [19]
Kobayashi et al.

[11] Patent Number: 6,001,485
[45] Date of Patent: Dec. 14, 1999

[54] WATER REPELLANT GLASS PLATE AND METHOD FOR MANUFACTURING THE SAME

[75] Inventors: Hiroaki Kobayashi; Hiroaki Yamamoto; Toyoyuki Teranishi; Takashi Sunada, all of Osaka, Japan

[73] Assignee: Nippon Sheet Glass Co., Ltd., Osaka, Japan

[21] Appl. No.: 08/970,671

[22] Filed: Nov. 14, 1997

[30] Foreign Application Priority Data

Nov. 18, 1996 [JP] Japan .................................. 8-306352

[51] Int. Cl.$^6$ ...................................................... B32B 17/00
[52] U.S. Cl. ........................ 428/428; 428/432; 427/167; 427/169; 427/397.7
[58] Field of Search ..................... 428/428, 432, 428/441; 427/165, 167, 169, 384, 397.7

[56] References Cited

U.S. PATENT DOCUMENTS

| | | | |
|---|---|---|---|
| 5,328,768 | 7/1994 | Goodwin | 428/428 |
| 5,413,865 | 5/1995 | Nakamura | 428/432 |

FOREIGN PATENT DOCUMENTS

| | | |
|---|---|---|
| 0 482 613 | 4/1992 | European Pat. Off. . |
| 0 545 201 | 6/1993 | European Pat. Off. . |
| 60-40254 | 3/1985 | Japan . |
| 62-178902 | 8/1987 | Japan . |
| 4-130032 | 5/1992 | Japan . |
| 4-132637 | 5/1992 | Japan . |
| 4-239633 | 8/1992 | Japan . |
| 4-285036 | 10/1992 | Japan . |
| 4-338137 | 11/1992 | Japan . |
| 6-279062 | 10/1994 | Japan . |
| 7-149512 | 6/1995 | Japan . |
| 8-188448 | 7/1996 | Japan . |

*Primary Examiner*—Timothy Speer
*Attorney, Agent, or Firm*—Merchant & Gould P.C.

[57] ABSTRACT

This invention provides a water repellant glass plate for vehicles or buildings, which shows a long-term durability. The water repellant glass plate includes a primer layer on a glass substrate, consisting essentially of silicon oxide in which oxygen atoms are partially substituted by hydroxyl groups, at a thickness between 10 nm and 100 nm, and a second layer on the first layer consisting of an organic silicon compound including a fluoroalkyl group at a thickness between about 0.2 nm and about 40 nm.

8 Claims, 1 Drawing Sheet

WATER REPELLANT GLASS PLATE AND METHOD FOR MANUFACTURING THE SAME

FIELD OF THE INVENTION

This invention relates to a water repellant glass plate. More specifically, this invention relates to a water repellant glass plate that is suitable for a window of vehicles, buildings, houses or the like, and a method for manufacturing such a water repellant glass plate.

BACKGROUND OF THE INVENTION

In order to make a surface of a glass substrate water-repellant, a water repellant film such as a fluorine-based film is formed on the surface. A water repellant glass plate having a water repellant film is used for a window of vehicles or buildings. In such a window, the glass plate as a substrate is usually composed of a glass composition such as a soda-lime silicate including an alkali metal.

Japanese Laid-open Patent Publication No. 60-40254 discloses a water repellant glass plate as described above which includes a primer film having a thickness of 0.1 $\mu$m or more formed by applying a silane compound such as a silane coupling agent to a surface of a glass plate, and a thin film of a compound having a polyfluoroalkyl group on the primer film. The organic polymer chains in the primer layer, which is thicker than usual, are entangled so that the hardness of the water repellant film is kept to some extent.

Japanese Laid-open Patent Publication No. 4-338137 discloses a water repellant glass plate having a $SiO_2$-based monolayer film, wherein non-metal atoms in the film are partially replaced with fluoroalkyl groups. The film can be produced by a sol-gel method in which fluoroalkylsilane is one of starting materials. A described example of the thickness of the monolayer film is 0.18 $\mu$m.

Japanese Laid-open Patent Publication No. 4-239633 discloses a water and oil repellant film that has a substrate such as a glass plate, a first layer having an uneven surface formed from a mixture of silicate glass and fine particles on the glass plate, and a second monomolecular layer including a fluorocarbon group on the first layer. The first layer has an unevenness of about 10 $\mu$m, which can improve the repellant effect of the second layer having a thickness between 1 $\mu$m and 5 $\mu$m.

Japanese Laid-open Patent Publication No. 5-238781 discloses a water repellant glass article that has a primer layer of silicon oxide and a water repellant layer formed from an agent including a perfluoroalkyl group. Although the ways of forming the silicon oxide primer layer such as a pyrolyzing method, a sol-gel method and a sputtering in the atmosphere including oxygen are disclosed, there is not described what is a preferable state of the primer film from a bond-structure point of view.

Japanese Laid-open Patent Publication No. 4-132637 discloses a contamination resistant glass plate having a monomolecular film composed of surface-active agents including a fluorocarbon group that shows water and oil repellancy. This monomolecular film can be formed by chemically binding a silane-based surface-active agent including a fluorocarbon group directly to the surface of the glass plate via the oxygen or nitrogen atoms. Although this art may be applied to the surface of a protective layer on a glass plate, there is not specifically described what is a preferable protective layer.

The water repellant glass plates as described above cannot provide a long-term durability for the water repellant effect that is sufficient to meet the requirement when the glass plate is used for vehicles or buildings.

SUMMARY OF THE INVENTION

As a glass plate for windows of vehicles or buildings, a water repellant glass plate that has a high weather-, chemical- and abrasion-resistant film is increasingly needed. Therefore, it is an object of the present invention to provide a water repellant glass plate that can keep the water repellant property for a long period of use.

According to this invention, there is provided a water repellant glass plate that includes a glass substrate of a glass composition including an alkali metal; a first layer on the glass substrate, consisting essentially of silicon oxide in which the oxygen atoms (O) are partially substituted by hydroxyl groups (OH), having a thickness between 10 nm and 100 nm; and a second layer on the first layer of an organic silicon compound including a fluoroalkyl group having a thickness between about 0.2 nm and about 40 nm.

The first layer as a primer layer lets the second layer as a water repellant layer adhere to the surface of the glass plate strongly. One of the reasons is that silicon oxide has a good property in sticking to a glass plate. Furthermore, according to the present invention, the hydroxyl groups on the surface of the first layer provide better reaction points with an organic silicon compound than those of the primer layer consisting of silicon oxide so that the first layer of the present invention can bind the second layer to the glass plate more tightly. Therefore, there is provided a water repellant glass plate showing a long-term durability, more specifically a sufficient weather-, chemical- and abrasion-resistance for a long period of use.

The thickness of the first layer as a primer layer can be selected arbitrarily from the range of 10 nm to 100 nm. When the first layer is thinner than 10 nm, the layer cannot prevent effectively the movement of alkaline ions out of the glass plate into the layers from affecting the water-repellant effect during a long-term use. When the first layer is thicker than 100 nm, the layer cannot keep the abrasion-resistant property effectively. From the former point of view, it is preferable that the thickness of the first layer is 20 nm or more, while it is preferable that the thickness of the layer is 80 nm or less from the latter point of view.

The second layer as a water repellant layer has a thickness of about 0.2 nm to about 40 nm. The second layer is mainly composed of the water repellant agents that chemically absorb to the first layer to adhere to the glass plate strongly, but the second layer may include any water repellant agents that physically absorb to the surface of the first layer as long as the object of the invention can be achieved.

The thickness of about 0.2 nm corresponds to the width of the molecular chain of —$CF_2$—, while the length of the molecule as represented by $CF_3(CF_2)_7(CH_2)_2Si(OCH_3)_3$ is about 2 nm. When the second layer has a layered structure composed of about five to ten molecules as represented by the above formula lying on the surface of the substrate, the thickness is estimated at about 15 nm. In the case of a layered structure composed of about 30 molecules, the thickness is estimated at 40 nm.

It is preferable that the thickness of the water repellant layer is between about 0.2 nm and about 15 nm, and more preferably the thickness is between about 0.2 nm and about 2 nm. Therefore, it is preferable that a water repellant agent including an organic silicon compound is applied to the surface of the first layer so as to form a second layer having a thickness as described above.

The first layer is not composed of stoichiometric silicon dioxide ($SiO_2$), but consists essentially of silicon oxide wherein the oxygen atoms bonding to the silicon atoms are partially substituted by hydroxyl groups. A too small quantity of the hydroxyl groups tends to reduce good reaction points with a water repellant agent, while a too large quantity of the hydroxyl groups tends to reduce Si—O bonds to lower the strength of the first layer. Therefore, it is preferable that the first layer is composed of $SiO_x(OH)_y$, wherein $1.7 \leq x < 2.0$ and $y = 4-2x$. According to the preferable first layer, there is provided a more durable water repellant glass plate.

The first layer may include another metal oxide such as zirconium oxide or titanium oxide as long as the object of the invention can be achieved.

DETAILED DESCRIPTION OF THE PREFERRED EMBODIMENTS

Figure 1:
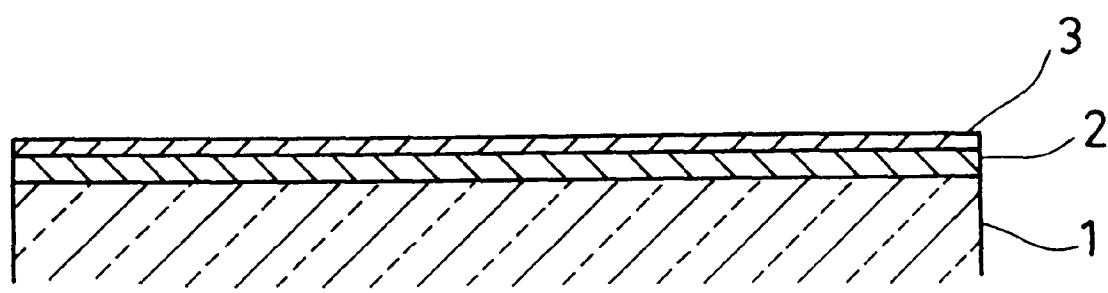
FIG. 1 is a cross-sectional view of an embodiment of the structure of the water repellant glass plate of the present invention.

As shown in FIG. 1, an embodiment of a water repellant glass plate of the present invention includes a glass substrate 1, which is composed of a glass composition containing an alkali metal such as a soda-lime silicate glass, a primer layer 2 on the glass substrate 1 and a water repellant layer 3 on the primer layer 2. As described above, the primer layer 2 is substantially composed of $SiO_x(OH)_y$ ($1.7 \leq x < 2.0$, $y = 4-2x$). The water repellant layer 3 has a thickness of about 0.2 nm to about 40 nm.

The primer layer 2 can be formed by a chemical vapor deposition method such as a thermal chemical vapor deposition method and a plasma chemical vapor deposition method, a vacuum deposition method, a physical vapor deposition method such as a sputtering method and a liquid phase method such as a sol-gel method. A liquid phase method is preferable because a high-purity and homogeneous layer can be easily formed. As a liquid phase method, there also can be mentioned the method in which $SiO_2$ is precipitated out of a $H_2SiF_6$ aqueous solution including saturated $SiO_2$.

In the case of a sol-gel method, a typical $SiO_2$ feedstock is silicon alkoxide. As the alkoxide, ethoxide, isopropoxide, butoxide or the like can be used, and more specifically, tetramethoxysilane, tetraethoxysilane, and methyltriethoxysilane or the like can be introduced. A high-molecular type of alkylsilicate such as "ETHYLSILICATE 40" manufactured by Colcoat Co., Ltd. and "MS56" manufactured by Mitsubishi Chemical Corporation can be used instead of silicon alkoxide. The raw material compounds as described above are hydrolyzed to prepare a coating solution. A commercially available glass coating solution including hydrolyzed alkoxysilane such as "HAS-10" manufactured by Colcoat Co., Ltd., "CERAMICA G-02-6" manufactured by Nichiita Laboratory and "ATRON NSI-500" manufactured by Nippon Soda Co., Ltd. also can be used so that the hydrolyzing process may be eliminated.

Silicon alkoxide can be hydrolyzed by stirring with water, a catalyst for hydrolysis and a solvent such as alcohol, and then by standing for a given time. As the catalyst, an inorganic acid such as hydrochloric acid and sulfuric acid, or an organic acid such as acetic acid and citric acid can be introduced. As the solvent, a water-soluble organic solvent represented by alcohol such as methanol, ethanol, propanol and butanol, or ketone such as acetone and methylethylketone can be used as well as water. As the water-soluble organic solvent, there also can be mentioned ethylcellosolve, butylcellosolve, cellosolve acetate, diacetone alcohol, tetrahydrofurfuryl alcohol and mesityl oxide. The mixture of the organic solvent and water also can be used for the solvent.

The hydrolyzed compound is coated onto the surface of the glass substrate 1 by various coating methods. As the coating method, there can be mentioned a coating method with a spin coater, a roll coater, a spray coater, a curtain coater or the like; a dipping method; a flow coating method; and a printing method such as screen printing, gravure printing, and curved-face printing. The hydrolyzed compound is applied onto the surface of the glass plate so that the layer may have a thickness of 10 nm to 100 nm after baking.

The glass substrate 1 with a coated layer is dried at a temperature between room temperature and 300° C. before being baked at higher temperature generally for a couple of seconds to several hours. It is preferable that the temperature of baking is selected so that x and y may come to be $1.7 \leq x < 2.0$ and $y = 4-2x$ in $SiO_x(OH)_y$ included in the primer layer 2 because the baking temperature has an influence on the quantity of hydroxyl groups in the silicon oxide after baking. Specifically, the baking temperature can be in the range from 500° C. to the softening point of the glass substrate, which is 735° C. in the case of soda-lime silicate glass. It is preferable that the baking temperature is in the range from 550° C. to the softening point, more preferably the range of 580° C. to the softening point.

When the glass substrate 1 is expected to be used as a tempered glass plate or a curved glass, the glass substrate 1 can be processed while the primer layer 2 is baked. Thus, the combination of baking and processing of tempering and/or bending makes it possible to increase the productivity and economize on the needed energy. For example, the glass substrate 1 with a coated layer on the surface can be heated to around its softening point with the coated layer baked, before being cooled rapidly for tempering. According to such a combination of the processes, a tempered glass plate with a water repellant film suitable for an automobile window or the like can be manufactured efficiently.

The water repellant layer 3 can be formed from a water repellant agent including a fluoroalkyl group. As such an agent, a silane compound including a fluoroalkyl group can be used. Specifically, the fluoroalkylsilyl compound as represented by formulae [1] to [3] can be used.

$$CF_3—(CF_2)_a—R^1—SiR^2{}_bR^3{}_{3-b} \qquad [1],$$

wherein a is an integer of 3 to 12; b is zero, one or two; $R^1$ is a secondary organic group having 1 to 10 of carbon atoms such as a methylene group, an ethylene group and a propylene group, or a group having a silicon atom and an oxygen atom; $R^2$ is a primary hydrocarbon group having 1 to 4 carbon atoms such as an alkyl group, a cycloalkyl group and an allyl group, or a derivative of the above groups, or hydrogen; and $R^3$ is an alkoxyl group or an acyloxy group having 1 to 4 carbon atoms.

$$CF_3—(CF_2)_a—R^1—SiR^2{}_bCl_{3-b} \qquad [2],$$

wherein a, b, $R^1$ and $R^2$ are as defined above.

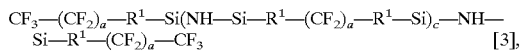  [3], wherein a and $R^1$ are as defined above; c is an integer of zero or more, preferably an integer of zero to six, more preferably zero or one.

The compound as represented by formulae [4] to [6] may be added to the water-repellant agent to make a critical angle smaller and to facilitate the shedding of a drop of water. It is preferable that the addition of these compounds is 20 weight % to 80 weight % relative to the entire weight of the water repellant agent.

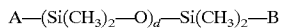  [4], wherein A and B independently are a hydroxyl group, a methyl group, a methoxy group or an ethoxy group; and d is an integer of 5 to 10.

  [5], wherein D is a chlorine or an alkoxyl group having 1 to 3 carbon atoms.

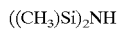  [6],

The water repellant agent is used for coating after hydrolyzing if necessary. For example, it is desirable that the agent represented by formula [1] is dissolved in a water-soluble organic solvent with a catalyst of acid and water to hydrolyze before being applied. This hydrolyzing before coating can improve the adhesive property of the water repellant film due to increased reactivity of the water repellant layer with the primer layer.

As the catalyst for hydrolysis, an inorganic acid such as hydrochloric acid and sulfuric acid, or an organic acid such as acetic acid and citric acid can be used. As the solvent, a water-soluble organic solvent such as alcohol (e.g. methanol, ethanol) and ketone (e.g. acetone, methylethylketone) can be introduced.

It is desirable that the water repellant agent represented by formula [2] or [3] is dissolved in a non-aqueous solvent such as xylene, n-hexane, cyclohexane or hexafluoromethaxylene in which any dissolved water in the solvent is fully reduced before use. These agents have a high reactivity with the primer layer without hydrolysis because the agents can be easily hydrolyzed by moisture in air.

The water repellant agent represented by formula [2] also can be applied by a low-pressure chemical vapor deposition method as disclosed in Japanese Laid-open Patent Publication No. 6-279062.

As the water repellant agent having a fluoroalkyl group, a water repellant agent including a co-hydrolysate of an organic silicon compound having a perfluoroalkyl group and methylpolysiloxane having a hydrolyzable group in a hydrophilic solvent; organopolysiloxane; and strong acid. The agent preferably includes co-hydrolysate of an organic silicon compound having a perfluoroalkyl group represented by formula [7] and methylpolysiloxane having a hydrolyzable group represented by formula [8] in a hydrophilic solvent; organosiloxane represented by formula [9]; and strong acid.

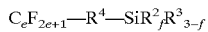  [7], wherein $R^2$ and $R^3$ are as defined above; $R^4$ is a secondary organic group having 2 to 10 carbon atoms; e is an integer of 1 to 12; and f is zero or one.

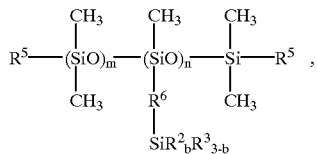  [8]

wherein b, $R^2$ and $R^3$ are as defined above; $R^5$ is a methyl group or a group represented by —$R^6$—$SiR^2_bR^3_{3-b}$ (b, $R^2$ and $R^3$ are as defined above and $R^6$ is defined as below), $R^6$ is an oxygen atom or a secondary organic group having 2 to 10 carbon atoms; m is an integer of 3 to 100; n is an integer of 0 to 50; m and n satisfy the relationship $5 \leq m+n \leq 100$; at least one $R^5$ is a group represented by —$R^6$—$SiR^2_bR^3_{3-b}$ (b, $R^2$, $R^3$ and $R^6$ are as defined above) when n=0. When there are more than two groups represented by —$R^6$—$SiR^2_bR^3_{3-b}$ in the same molecule, the groups may be the same or different from each other.

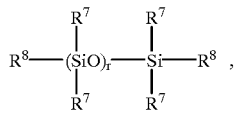  [9]

wherein $R^7$ is a primary hydrocarboxyl group having 1 to 20 carbon atoms; $R^8$ is a primary hydrocarboxyl group, an alkoxyl group or an acyl group having 1 to 4 of carbon atoms, or a hydroxyl group; and r is an integer of 1 to 100.

In the co-hydrolysate as described above, an organic silicon compound having a perfluoroalkyl group represented by formula [7] contributes to the water repellant effect of the water repellant film while methylpolysiloxane having a hydrolyzable group represented by formula [8] contributes to reducing the critical angle with water of the film. Furthermore, silanol groups produced by co-hydrolyzing the above two compounds have a high reactivity with the primer layer composed of an inorganic material. Organosiloxane represented by formula [9] makes the critical angle still lower. Strong acid increases the reactivity of the organic silicon compounds and the methylpolysiloxane with the surface of the primer layer. Therefore, the water repellant layer produced from the raw materials as described above can show a sufficient repellant effect and keep the effect for a long period. The starting materials as described above are soluble in a hydrophilic solvent, which makes it easy to form a water repellant film on a glass plate.

More specifically, examples of the organic silicon compounds represented by formula [7] are $C_4H_9CH_2CH_2Si(CH_3)(OCH_3)_2$ and $C_8H_{17}CH_2CH_2Si(OCH_3)_3$.

Examples of the polysiloxane represented by formula [8] are represented by formulae [10] to [12].

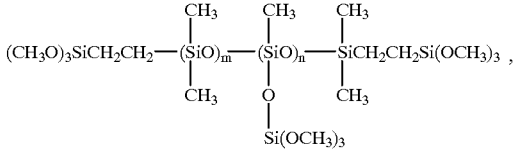  [10]

-continued

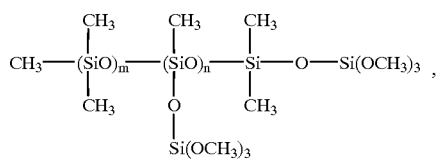  [11]

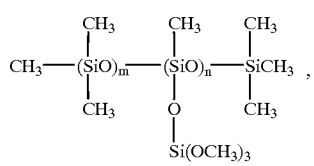  [12]

wherein m, n and m+n are as described above, and preferably $5 \leq m+n \leq 100$.

It is preferable that the ratio of the organic silicon compound represented by formula [7] to the methylpolysiloxane represented by formula [8] is 10/90 to 90/10, more preferably 20/80 to 80/20, by weight, because the ratio of less than 10/90 may affect the water repellant effect and the ratio more than 90/10 may affect the critical angle of a drop of water.

Examples of the organopolysiloxane represented by formula [9] are represented by formulae [13] to [16].

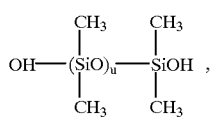  [13]

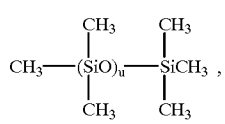  [14]

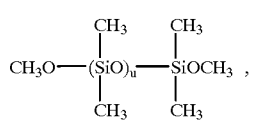  [15]

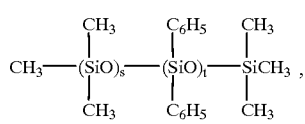  [16]

wherein u is an integer of 1 to 100, and s+t=u.

It is preferable that the ratio of the organopolysiloxane represented by formula [9] to the total available amount of the organic silicon compound represented by formula [7] and the methylpolysiloxane represented by formula [8] ("the available amount" is defined by reducing the hydrophilic solvent from the co-hydrolysate) is 10/90 to 99/1, more preferably 40/60 to 90/10, by weight. This is because the ratio less than 10/90 may affect the durability of the water repellant film and the ratio more than 99/1 may affect the critical angle of the film.

Examples of the strong acid are hydrochloric acid, sulfuric acid, methanesulfonic acid, trifluoromethanesulfonic acid, p-toluenesulfonic acid, trichlorosulfonic acid, trichloroacetic acid and phosphoric acid.

It is preferable that the addition of the strong acid to the total of the amount of organopolysiloxane and the total available amount of the organic silicon compound and the methylpolysiloxane is 0.01 weight % to 100 weight %, more preferably 0.1 weight % to 50 weight %, because the addition of less than 0.01 weight % may affect the durability of the water repellant film and the addition more than 100 weight % may affect the stability of the water repellant agent.

In order to reduce the critical angle, the compound represented by formula [5] or [6] can be applied onto the surface of the water repellant layer by coating with a solvent or deposited from gaseous phase.

EXAMPLES

Example 1

First, a coating solution for a primer layer was prepared.

After 18.7 weight parts of isopropanol were added to 21.3 weight parts of "HAS-10" manufactured by Colcoat Co., Ltd., which is alkoxysilane hydrolyzed to some extent, the solution was stirred at room temperature for three hours. Then, after 280 weight parts of isopropanol were added to the solution, the solution was stirred at room temperature for 30 minutes to prepare a coating solution for a primer layer No. 1 that included 0.7 weight % of silicon dioxide ingredient.

A soda-lime silicate glass plate (150 mm×70 mm×3.5 mm) was washed with alkali and acid respectively, followed by washing and polishing with a cerium oxide based polishing agent. After being air-dried, the glass plate was dipped into the coating solution and drawn up from the solution. The coated layer on the glass plate was dried at 250° C. for an hour and was baked at 550° C. The obtained primer layer had a thickness of 80 nm and a smooth surface.

In order to prepare a coating solution for a water repellant layer, 10.0 weight parts of organic silicon compounds represented by $C_8F_{17}CH_2CH_2Si(OCH_3)_3$, 10.0 weight parts of methylpolysiloxane represented by formula [17], 360 weight parts of t-butanol and 1.94 weight parts of 0.1 normal hydrochloric acid were introduced into a one liter glass reactor with a thermometer, a stirrer and a condenser. After being hydrolyzed at 80° C. for five hours, the solution was further stirred at room temperature for 10 hours with 160 weight parts of n-hexane that is a hydrophobic solvent.

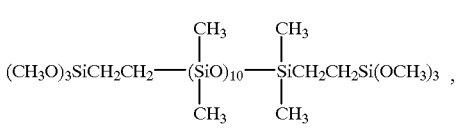  [17]

Then, 10.0 weight parts of organosiloxane represented by formula [18] and 5.0 weight parts of methanesulfonic acid were added into the reactor, followed by stirring for 10 minutes, to prepare a coating solution for a water repellant layer No.1.

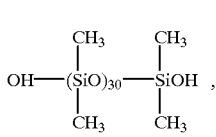  [18]

A proper amount (about 0.1 milliliter) of the coating solution for a water repellant layer No.1 was spread on the surface of the primer layer ten times with a cotton cloth. After the excess solution was wiped off with a dry cloth, the coated glass plate was heated at 100° C. for 10 minutes to prepare a water repellant glass plate (Sample 1).

The water repellant film on the glass plate was tested for the resistance to abrasion, chemical and weather. The abrasion resistance test was carried out with a testing machine manufactured by SHINTO Scientific Co., Ltd. to which a dry cloth was fitted. The contact angle was measured after the dry cloth went back and forth 3,000 times on the surface of the film with a load at 0.3 kg/cm$^2$. The chemical resistance test was carried out by dipping the glass plate in lime water of pH 11. The contact angle was measured after dipping for 24 hours. The weather resistance test was carried out with a weathering test machine, "EYE SUPER UV TESTER W13" manufactured by Iwasaki Electric Co., Ltd. The film was tested for 400 hours with ultraviolet rays applied to on the condition that an illumination was 76±2 mW/m$^2$, a black panel temperature was 48±2° C. and a showering was applied for 30 seconds every one hour, before the contact angle was measured. All the contact angles as described above were measured with water. The results are shown in Table 1.

In the same way as described above except that the baking temperature of the primer layer was 300° C., another water repellant glass plate was prepared (Sample 2). The measurement of x values in $SiO_x(OH)_y$ of the water repellant glass plates by X-ray photoelectron spectroscopy (ESCA) showed that x was 1.8 in Sample 1 and x was 1.6 in Sample 2.

Furthermore, in the same way as described above except that the amount of silicon oxide in the coating solution for the primer layer was changed (the more silicon oxide in the solution corresponds to the thicker primer layer.), water repellant glass plates were produced (Sample 3 to Sample 5). For comparison, a commercial water repellant agent that includes polydimethylsiloxane as a main component was directly applied to and spread on the surface of the glass plate to prepare another water repellant glass plate (Sample 6). The resistance to abrasion, chemical and weather of Samples 2 to 6 was measured in the same way as described above. These results are also shown in Table 1.

Sample 5 having a thinner primer layer and Sample 6 having no primer layers.

Example 2

In order to make a solution for a primer layer, 100 g of ethylsilicate that is a tetramer of tetraethoxysilane ("ETHYLSILICATE 40" manufactured by Colcoat Co., Ltd.), 12 g of 0.1 normal hydrochloride acid and 88 g of ethylcellosolve were mixed, followed by stirring at room temperature for two hours to prepare a silicon oxide starting solution A. This solution included 20 weight % of silicon dioxide ingredient.

The mixture of 390 g of diacetone alcohol, 35 g of water and 75 g of the silicon oxide starting solution A were stirred to prepare a coating solution for a primer layer No. 2. This solution included 3 weight % of silicon dioxide ingredient.

The coating solution for a primer layer No. 2 was applied onto the surface of a soda-lime silicate glass plate of 150 mm×70 mm×3.4 mm by a gravure coating method, after the glass plate was washed and polished with a cerium oxide based polishing agent. After being air-dried, the layer was heat-treated at 250° C. for an hour, followed by baking at 600° C. for an hour to prepare a primer layer. The obtained primer layer had a thickness of 40 nm and a suitable appearance.

Into a one-liter glass reactor with a thermometer, a stirrer and a condenser, 10.0 g of the organic silicon compound represented by $C_8F_{17}CH_2CH_2Si(OCH_3)_3$, 10.0 g of methylpolysiloxane represented by formula [17], 360.0 g of t-butanol and 1.94 g of 0.1 normal hydrochloric acid were introduced, followed by co-hydrolyzing at 80° C. for five hours. The co-hydrolysate was further stirred at room temperature for 10 hours with 160.0 g of n-hexane that is a hydrophobic solvent. After 10.0 g of organosiloxane represented by formula [18] and 5.0 g of methanesulfonic acid were added into the reactor, the mixture were stirred for 10 minutes to prepare a coating solution for a water repellant layer No. 2.

Onto the surface of the primer layer formed in the above process, 0.1 milliliter of the solution for a water repellant layer No. 2 was applied and spread ten times with a cotton

TABLE 1

| Sample | (Primer layer) | | Contact Angle at initial | (Resistance) | | |
|---|---|---|---|---|---|---|
| | Thickness (nm) | Baking Temp. (°C.) | | Abrasion | Chemical | Weather |
| 1 | 80 | 550 | 106 | A | A | A |
| 2 | 80 | 300 | 105 | A | B | B |
| 3 | 200 | 550 | 105 | B* | A | A |
| 4 | 20 | 550 | 105 | A | A | A |
| 5 | 5 | 550 | 105 | A | B | B |
| 6 | — | — | 100 | C | A | B |

(B* means that there are noticeable flaws on the surface of the film.)

In Table 1, a mark of "A" means a contact angle of 85° or more, a mark of "B" means a contact angle at least 70° and less than 85° and a mark of "C" means a contact angle less than 70°. As seen from Table 1, the water repellant glass plates of Sample 1 and Sample 4 which baked at an appropriate temperature and have an appropriate primer layer in thickness show a better durability than the other water repellant glass plates including Sample 2 baked at lower temperature, Sample 3 having a thicker primer layer, cloth, followed by wiping off the excess solution with a dry cloth. The formed film was heat-treated at 100° C. for 10 minutes to prepare a water repellant glass (Sample 7).

Example 3

The mixture of 50 g of "ETHYLSILICATE 40" manufactured by Colcoat Co., Ltd., 6 g of 0.1 normal hydrochloric acid and 44 g of ethanol were stirred at room temperature for two hours to prepare a silicon oxide starting solution B. This solution included 20 weight % of silicon dioxide ingredient. The mixture of 340 g of diacetone alcohol, 50 g of ethanol, 35 g of water and 75 g of the silicon oxide starting solution B were stirred to prepare a coating solution for a primer layer No. 3. This solution included 3 weight % of silicon dioxide ingredient. In the same way as Sample 7 except that the coating solution for a primer layer No. 3 was used instead of the coating solution for a primer layer No. 2, a water repellant glass plate (Sample 8) was prepared.

Example 4

The mixture of 190 g of diacetone alcohol, 200 g of ethanol, 35 g of water and 75 g of the silicon oxide starting solution B was stirred to prepare a coating solution for a primer layer No. 4. This solution included 3 weight % of silicon dioxide ingredient. In the same way as Sample 7 except that the coating solution for a primer layer No. 4 was used instead of the coating solution for a primer layer No. 2, a water repellant glass plate (Sample 9) was prepared.

Example 5

The mixture of 290 g of diacetone alcohol, 100 g of mesityl oxide, 35 g of water and 75 g of the silicon oxide starting solution B was stirred to prepare a coating solution for a primer layer No. 5. This solution included 3 weight % of silicon dioxide ingredient. In the same way as Sample 7 except that the coating solution for a primer layer No. 5 was used instead of the coating solution for a primer layer No. 2, a water repellant glass plate (Sample 10) was prepared.

Example 6

The mixture of 290 g of ethylcellosolve, 100 g of ethanol, 35 g of water and 75 g of the silicon oxide starting solution B were stirred to prepare a coating solution for a primer layer No. 6. This solution included 3 weight % of silicon dioxide ingredient. In the same way as Sample 7 except that the coating solution for a primer layer No. 6 was used instead of the coating solution for a primer layer No. 2, a water repellant glass plate (Sample 11) was prepared.

Example 7

The mixture of 240 g of diacetone alcohol, 100 g of ethanol, 35 g of water and 125 g of the silicon oxide starting solution B were stirred to prepare a coating solution for a primer layer No. 7. This solution included 5 weight % of silicon dioxide ingredient. In the same way as Sample 7 except that the coating solution for a primer layer No. 7 was used instead of the coating solution for a primer layer No. 2, a water repellant glass plate (Sample 12) was prepared.

Example 8

The mixture of 310 g of diacetone alcohol, 100 g of ethanol, 15 g of water and 75 g of the silicon oxide starting solution B was stirred to prepare a coating solution for a primer layer No. 8. This solution included 3 weight % of silicon dioxide ingredient.

The coating solution for a primer layer No. 8 was applied onto the surface of a soda-lime silicate glass plate of 150 mm×70 mm×3.4 mm by a gravure coating method, after the glass plate was washed and polished with a cerium oxide based polishing agent. After being air-dried, the coating was heat-treated at 250° C. for 30 minutes, followed by baking at 650° C. for three minutes to prepare a primer layer. The primer layer had a thickness of 40 nm and a sufficient appearance.

Into a two-liter glass reactor with a thermometer, a stirrer and a condenser, 20.0 g of the organic silicon compound represented by $C_8F_{17}CH_2CH_2Si(OCH_3)_3$, 320.0 g of t-butanol and 4.6 g of 0.05 normal hydrochloric acid were introduced, followed by co-hydrolyzing at 25° C. for 24 hours. The co-hydrolysate was further stirred at room temperature for 24 hours with 640.0 g of n-hexane for dilution. Then, 5.0 g of methanesulfonic acid was added to the mixture, followed by stirring for 10 minutes to prepare a coating solution for a water repellant layer No. 3.

Onto the surface of the primer layer produced in the above process, 0.1 milliliter of the solution for a water repellant layer No. 3 was applied and spread with a cotton cloth ten times, followed by wiping off the excess solution to prepare a water repellant glass plate (Sample 13).

Example 9

The mixture of 275 g of diacetone alcohol, 100 g of ethanol, 50 g of water and 75 g of the silicon oxide starting solution B was stirred to prepare a coating solution for a primer layer No. 9. This solution included 3 weight % of silicon dioxide ingredient. In the same way as Sample 13 except that the solution for a primer layer No. 8 was used instead of the solution for a primer layer No. 7, a water repellant glass plate (Sample 14) was prepared.

The efficiency test of Sample 7 to Sample 14 was carried out in the same way as described above. The results are shown in Table 2. The marks of "A", "B" and "C" have the same meanings in Table 1.

TABLE 2

| Sample | (Primer layer) | | Contact Angle at initial | (Resistance) | | |
| | Thickness (nm) | Baking Temp. (°C.) | | Abrasion | Chemical | Weather |
| --- | --- | --- | --- | --- | --- | --- |
| 7 | 40 | 600 | 107 | A | A | A |
| 8 | 40 | 600 | 108 | A | A | A |
| 9 | 40 | 600 | 106 | A | A | A |
| 10 | 40 | 600 | 106 | A | A | A |
| 11 | 40 | 600 | 108 | A | A | A |
| 12 | 60 | 600 | 107 | A | A | A |
| 13 | 40 | 650 | 108 | A | A | A |
| 14 | 40 | 650 | 106 | A | A | A |

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and rule of equivalency of the claims are intended to embraced therein.

We claim:

1. A water repellant glass plate which comprises a glass substrate having a glass composition including an alkali metal; a first layer on the glass substrate, consisting essentially of silicon oxide in which oxygen atoms are partially replaced by hydroxyl groups, and having a thickness between 10 nm and 100 nm; and a second layer on the first layer consisting essentially of an organic silicon compound including a fluoroalkyl group and having a thickness between about 0.2 nm and about 40 nm.

2. A water repellant glass plate according to claim 1, wherein the first layer is composed of $SiO_x(OH)_y$, wherein $1.7 \leq x < 2.0$ and $y = 4 - 2x$.

3. A water repellant glass plate according to claim 1, wherein the first layer has a thickness of at least 20 nm.

4. A water repellent glass plate according to claim 1, wherein the first layer has a thickness not more than 80 nm.

5. A water repellant glass plate according to claim 1, wherein the second layer has a thickness not more than about 15 nm.

6. A process for manufacturing a water repellant glass plate comprising the steps of:

contacting a first solution including an organic silicon compound with a surface of a glass substrate, the glass substrate having a glass composition including an alkali metal, to form a first layer on the glass substrate;

baking the first layer so that the first layer consists essentially of silicon oxide in which oxygen atoms are partially replaced by hydroxyl groups and has a thickness between 10 nm and 100 nm; and contacting a second solution including an organic silicon compound having a fluoroalkyl group with a surface of the first layer to form a second layer consisting essentially of the organic silicon compound having a thickness between about 0.2 nm and about 40 nm on the first layer.

7. A process according to claim 6, wherein the first layer is baked at a temperature between 500° C. and the softening point of the glass substrate.

8. A process according to claim 6, wherein the second solution includes co-hydrolysate of an organic silicon compound having a perfluoroalkyl group and methylpolysiloxane having a hydrolyzable group, organopolysiloxane, and strong acid.

* * * * *